United States Patent
Walters

[15] 3,688,855
[45] Sept. 5, 1972

[54] TAPE SUSPENDED BALANCE
[72] Inventor: John Walters, Lexington, Mass.
[73] Assignee: American Science & Engineering Inc., Cambridge, Mass.
[22] Filed: Dec. 11, 1970
[21] Appl. No.: 97,170

[52] U.S. Cl.............177/196, 177/263, 177/DIG. 9
[51] Int. Cl..........G01g 1/20, G01g 3/08, G01g 3/10
[58] Field of Search........177/DIG. 9, 190, 193–196, 177/225, 229, 263, 264

[56] References Cited

UNITED STATES PATENTS 246,057  8/1881  Abbott.................177/DIG. 9

FOREIGN PATENTS OR APPLICATIONS 987,404  4/1951  France................177/DIG. 9
1,036,177  7/1964  Great Britain........177/DIG. 9

Primary Examiner—Robert S. Ward, Jr.
Attorney—Charles Hieken

[57] ABSTRACT

A balance comprises a beam centered about and suspended from a flexible tape, the tape being flexible in a direction along the length of the beam but being much less flexible in a direction at right angles to the length of the beam.

2 Claims, 1 Drawing Figure

PATENTED SEP 5 1972　　　　　　　　　3,688,855
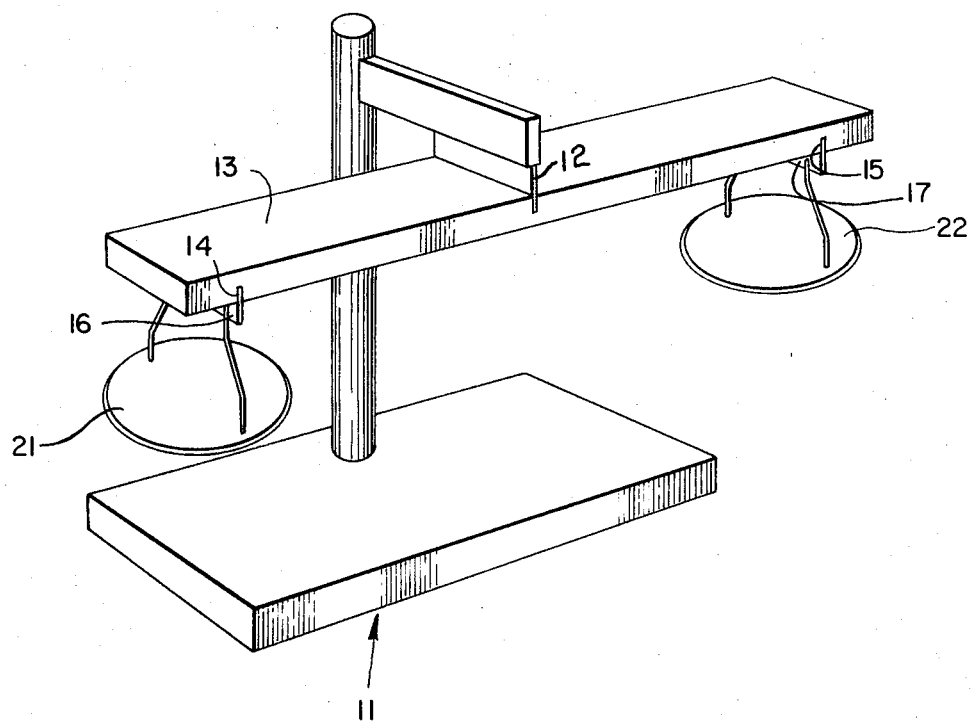
INVENTOR
JOHN　WALTERS
BY
Charles Hickon
ATTORNEY

TAPE SUSPENDED BALANCE

BACKGROUND OF THE INVENTION

The present invention relates in general to an inexpensive balance characterized by a relatively high degree of precision that is rugged enough for use by school children and easy to use. A balance according to the invention is relatively inexpensive and easy to manufacture, relatively easy to use by inexperienced school children and yet provides a high degree of accuracy.

It is an important object of this invention to provide an inexpensive precision balance suitable for use by young school children.

It is a further object of the invention to achieve the preceding object with a relatively simple rugged structure.

SUMMARY OF THE INVENTION

According to the invention there is a beam supported by tape that is flexible in a direction along the length of the beam while being much less flexible in a direction at right angles to the length of the beam. Pan means are supported at opposite ends of the beam by tape means having similar characteristics. Preferably the pan means are alike and equidistant from the midpoint of the beam which midpoint is embraced by the cross sectional area of the tape means that supports the beam.

Numerous other features, objects and advantages of the invention will become apparent from the following specification when read in connection with the accompanying drawing, the single FIGURE of which

BRIEF DESCRIPTION OF THE DRAWING shows a perspective view of an embodiment of the invention with the beam below the supporting tape.

DETAILED DESCRIPTION OF PREFERRED EMBODIMENTS

With reference now to the drawing, there is shown a perspective view of an embodiment of the invention. A base 11 supports a strip of flexible tape 12 which supports beam 13 in a slot embracing the center line of the beam along its width. Beam 13 is formed with end slots 14 and 15 which support tapes 16 and 17, respectively, which in turn support weighing pans 21 and 22, respectively.

Tapes 12, 16 and 17 are preferably flexible in a direction along the length of beam 13 while being much less flexible and nearly rigid in a direction at right angles to the length. For example, tapes 12, 16 and 17 may be made of thin metal, such as phosphor bronze, or numerous available plastics.

Base 11 could be of almost any form. The specific means for affixing tapes 16 and 17 to the pans could take various forms.

Alternately, pans 21 and 22 and beam 13 could be each suspended from a pair of spaced strings that would still help reduce torsion.

It is apparent that those skilled in the art may now make numerous other uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A tape suspended balance comprising,
   a beam,
   a tape of width corresponding substantially to that of said beam,
   said tape supporting said beam intermediate its ends along substantially the entire width thereof with the plane of said tape perpendicular to the length of said beam and being flexible in a direction along the length of said beam,
   said tape being much less flexible along a direction orthogonal to than along said direction along the length of said beam,
   and base means for supporting the end of said tape away from the end thereof supporting said beam along substantially the entire width thereof.

2. A tape suspended balance in accordance with claim 1 and further comprising,
   pan means at opposite ends of said beam supported by respective pan tapes of widths corresponding substantially to that of said beam and said first-mentioned tape characterized by flexibility in a direction along the length of said beam,
   said pan tapes being attached to said beam along substantially the entire width thereof with the planes of said pan tapes parallel to that of said first-mentioned tape,
   said pan tapes being much less flexible along a direction orthogonal to than along said direction along the length of said beam.

* * * * *